United States Patent [19]

Grossman

[11] Patent Number: 5,187,804
[45] Date of Patent: Feb. 16, 1993

[54] METHOD OF CONTROLLING THE MERCURY VAPOR PRESSURE IN A PHOTO-CHEMICAL LAMP OR VAPOR FILTER USED FOR HG$^{196}$ ENRICHMENT

[75] Inventor: Mark W. Grossman, Belmont, Mass.

[73] Assignee: GTE Products Corporation, Danvers, Mass.

[21] Appl. No.: 708,798

[22] Filed: May 30, 1991

Related U.S. Application Data

[63] Continuation of Ser. No. 352,318, May 15, 1989, abandoned.

[51] Int. Cl.$^5$ .................... H01J 9/395; H01J 61/24; H01J 61/20
[52] U.S. Cl. .................................... 445/9; 313/490; 313/639
[58] Field of Search ............... 313/490, 639; 445/38, 445/9; 350/1.5

[56] References Cited

U.S. PATENT DOCUMENTS

| | | | |
|---|---|---|---|
| 2,713,025 | 7/1955 | Billings | 313/639 X |
| 3,152,278 | 10/1964 | Dziergwa et al. | 445/38 X |
| 3,392,298 | 7/1968 | Menelly | 313/490 |
| 4,379,252 | 4/1983 | Work et al. | 313/639 X |
| 4,527,086 | 7/1985 | Maya | 313/639 X |
| 4,661,078 | 4/1987 | Grossman et al. | 445/9 |
| 4,746,832 | 5/1988 | Grossman et al. | 313/24 X |
| 4,789,784 | 12/1988 | Grossman et al. | 350/1.5 X |
| 4,800,284 | 1/1989 | Grossman et al. | 350/1.5 X |
| 4,839,524 | 6/1989 | Grossman et al. | 350/1.5 X |

Primary Examiner—Palmer C. DeMeo
Attorney, Agent, or Firm—R. E. Walter

[57] ABSTRACT

The present invention is directed to a method of eliminating the cold spot zones presently used on Hg$^{196}$ isotope separation lamps and filters by the use of a mercury amalgams, preferably mercury - indium amalgams. The use of an amalgam affords optimization of the mercury density in the lamp and filter of a mercury enrichment reactor, particularly multilamp enrichment reactors. Moreover, the use of an amalgam in such lamps and/or filters affords the ability to control the spectral line width of radiation emitted from lamps, a requirement for mercury enrichment.

2 Claims, 2 Drawing Sheets

METHOD OF CONTROLLING THE MERCURY VAPOR PRESSURE IN A PHOTO-CHEMICAL LAMP OR VAPOR FILTER USED FOR HG$^{196}$ ENRICHMENT

STATEMENT OF GOVERNMENT INTEREST

The Government of the United States of America has rights in this invention pursuant to Subcontract 4540710 under Prime Contract DE-AC03-76SF00098 awarded by the Department of Energy.

This is a continuation of copending application Ser. No. 07/352,318 filed on May 15, 1989, now abandoned.

FIELD OF THE INVENTION

The present invention is directed to a method and composition useful in the isotopic enrichment of a predetermined isotope of mercury (Hg) from a naturally occurring mercury mixture. While the present invention may be used in the enrichment of any one of the seven naturally occurring isotopes of mercury ($Hg^{202}$, $Hg^{200}$, $Hg^{199}$, $Hg^{201}$, $Hg^{198}$, $Hg^{204}$, and $Hg^{196}$) it has particularly advantageous application in the enrichment of the $^{196}Hg$ isotope, which has a natural abundance of only about 0.146 percent.

BACKGROUND OF THE INVENTION

Many devices utilize mercury in their operation, particularly in the field of electric lamps and lighting. Such devices include fluorescent lamps which typically employ mercury as one of the vaporizable components therein. See, for example, Waymouth, *Electric Discharge Lamps*, MIT Press 1971 for a description of the basic principles of such lamps.

In U.S. Pat. No. 4,379,252, the '252 patent), the advantages of utilizing higher than normal levels of $^{196}Hg$ in the Hg added to fluorescent lamps are described and include unexpectedly high efficiency gains in light output. The disclosure of this patent is hereby incorporated herein by reference.

The drawback of using this isotope lies in its high cost. For example, using conventional enrichment techniques, mercury which has been enhanced to contain about 35% of the $^{196}Hg$ isotope can cost about $500 per milligram. While only sub-milligram quantities of this isotope need be added to an incandescent lamp to afford beneficial results, economic realities always play a part in consumer products. Accordingly, it is easy to understand why more economical methods of obtaining this isotope continue to be sought.

Isotopically enriched mercury can be produced by a number of methods. One method involves photosensitized chemical reactions utilizing elemental mercury and various compounds. The compounds HCl and $O_2$ react with mercury atoms when the mercury atoms are excited by resonance radiation, in particular, 2537 Å radiation produced in a Hg ($^3P$ - $^1S_o$) transition generating isotopically selective reactions. Thus, the Hg compound formed contains Hg enriched in a particular isotope, and the Hg must be separated from the compound into its liquid or free state (i.e,. elemental Hg)) in order to recover the isotopically enriched metal.

INFORMATION DISCLOSURE STATEMENT

Dziergwa et al., in U.S. Pat. No. 3,160,778, describe fluorescent lamps containing an amalgam of mercury, indium, and cadmium. The amalgams of this invention exhibit a strong vapor pressure decreasing effect during lamp operation, with increased lamp output.

Evans et al., in U.S. Pat. No. 3,526,804. describe fluorescent lamps containing an amalgam of tin-indium-mercury. This amalgam is used to control the mercury vapor pressure during operation of the lamp, thereby permitting efficient operation at high power loads and/or within a wide range of ambient temperatures.

Evans, in U.S. Pat. No. 3,619,697, describes fluorescent lamps containing an amalgam of tin-indium-mercury. This amalgam is used to control the mercury vapor pressure during operation of the lamp. Various amalgam-holding structures, including temperature - compensating types employing bimetal elements, and a method of fabricating the vapor pressure control components are also disclosed.

Evans et al., in U.S. Pat. No. 4,145,634, describe mercury-vapor discharge lamps containing free, discrete bodies of indium or an indium alloy for the regulation of the mercury vapor pressure during operation of the lamp. These free metal bodies are not secured to any part of the lamp, they move about within the envelope until they combine (amalgam) with the mercury dosed in the finished lamp. These amalgam bodies furnish controlled amounts of mercury vapor when the lamp is energized.

Wesselink et al., in U.S. Pat. No. 4,157,485 describe a low pressure mercury vapor discharge lamp having a discharge space provided with two thermally emitting electrodes as well as an amalgam of bismuth, indium, and mercury. Other patents are described therein which provide information regarding other useful mercury amalgams.

In U.S. Pat. No. 4,746,832, a two temperature zone lamp is described. In addition, the control of the spectral line width of the 253.7 nm hyperfine structure is also described.

In U.S. Pat. Nos. 4,800,284 and 4,789,784 there is set forth one method of controlling the vapor pressure of a Hg vapor filter.

In each of these last three patents, a "cold spot" zone was used to maintain mercury vapor pressure. A "cold spot" is a zone in the lamp or filter where the Hg is located and kept at or below the temperature of the rest of the lamp or filter. Maintenance of this cold spot temperature typically requires external cooling means, such as water jackets and the like.

It has been discovered that mercury amalgams, particularly mercury-indium amalgams, can replace the cold spot zones presently used on $Hg^{196}$ isotope separation lamps and filters. This will simplify the operation of these devices and reduce their manufacturing cost.

Each of the above-referenced patents is hereby incorporated herein by reference.

The following documents are recited as general background information with respect to the subject matter of the present invention. To the extent deemed necessary by artisans of ordinary skill in the art to which this invention pertains, the teachings of these documents are hereby incorporated herein by reference.

Grossman, U.S. Pat. No. 4,713,547;
Grossman et al., U.S. Pat. No. 4,678,550;
Maya, U.S. Pat. No. 4,52,7,086;
Durbin, U.S. Pat. No. 4,514,363;
Work et al., U.S. Pat. No. 4,379,252;
Botter nee Bergheaud et al., U.S. Pat. No. 3,983,019;
Smith et al., U.S. Pat. No. 3,897,331;

Grossman et al., U.S. Ser. No. 815,150, filed Dec. 31, 1985;

European Patent Publication No. 0 281 687, published Sep. 14, 1988, claiming priority of U.S. Ser. No. 947,217, filed Dec. 29, 1986; and European Patent Publication No. 0 280 788, published Sep. 7, 1988, claiming priority of U.S. Ser. No. 947,216, filed Dec. 29, 1986.

SUMMARY OF THE INVENTION

The present invention is directed to a method of eliminating the cold spot zones presently used on $Hg^{196}$ isotope separation lamps and filters by the use of a mercury amalgams, preferably mercury - indium amalgams. The use of an amalgam affords optimization of the mercury density in the lamp and filter of a mercury enrichment reactor, particularly multilamp enrichment reactors.

Moreover, the use of an amalgam in such lamps and/or filters affords the ability to control the spectral line width of radiation emitted from lamps, a requirement for mercury enrichment.

Finally, the use of an amalgam allows for the simplification of the handling of small quantities of $Hg^{196}$ required in isotope photochemical lamp manufacturing. The In-Hg amalgam is a solid making it easier to handle than liquid Hg. Further, smaller quantities of amalgam containing $Hg^{196}$ may be used than the 2 mg/lamp of liquid $Hg^{196}$ presently being used [at a cost of $1000/mg]. A factor of 10 reduction in the quantity of $Hg^{196}$ needed represents a significant savings particularly when multilamp reactors are being utilized.

DETAILED DESCRIPTION OF THE PREFERRED EMBODIMENTS

In the present invention the "cold spot" zone in mercury enrichment lamps and/or filters is eliminated by use of an amalgam, preferably an amalgam comprising mercury and indium. The composition of the amalgam is selected such that for the desired operating temperature of a given device (e.g., lamp or filter) the Hg vapor pressure is sufficient to give a suitable filtering of the 253.7 nm hyperfine structure for the isotope separation process being conducted.

Under the preferred conditions of a 10 mm ID photochemical lamp and 10 mm gap mercury vapor filter one wishes to have a lamp cold spot temperature of 20° C.±2° C. and filter cold spot temperature of 45°±5° C. (See, U.S. Pat. Nos. 4,789,784 and 4,800,284). Thus, it is desirable for the amalgam to mimic these results for the standard lamp. Other lamp/filter arrangements will have alternate requirements, which can readily be determined by the skilled artisan upon consideration of the teachings of the present specification.

The excitation source for the reactor was a mercury lamp and filter arrangement, which produces mercury resonance radiation which excites only the $Hg^{196}$ isotope. The temperature of the filter used in this set up is of critical importance, as it controls the spectral purity of the light, and hence the efficiency of the enrichment process.

Prior to this invention, the filter was maintained at the desired temperature using an auxiliary water cooler. The use of an amalgam in place of pure mercury in the filter would suppress the mercury vapor pressure for a given fixed temperature, or, in other words, provide the same mercury vapor pressure at higher ambient temperatures, eliminating the need for an auxiliary cooler, thereby simplifying the reactor operation.

Figure 1:
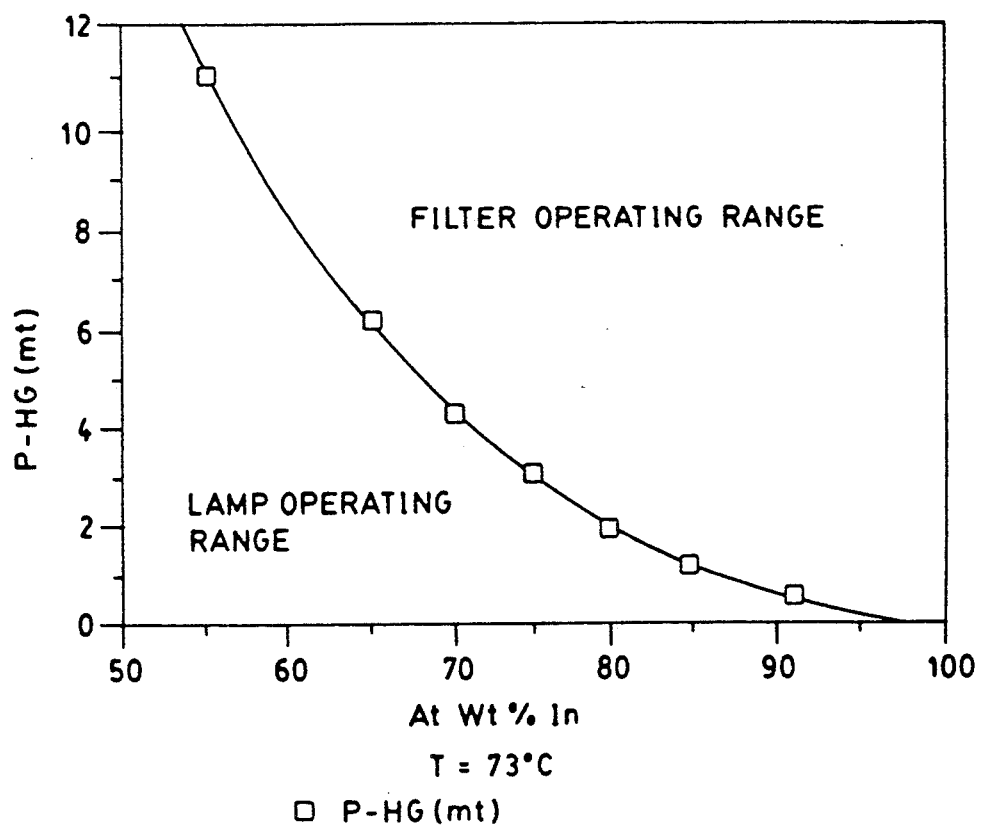
FIG. 1 describes the calculated variation of mercury partial pressure as a function of fractional atomic weight percent of indium using a thermodynamic calculation.

FIG. 1 shows the variation of mercury vapor pressure (partial pressure, density) as a function of atomic weight percent of indium in the amalgam at the desired filter operating temperature of 73° C. Based on these data, and the requirement of a 3-11 micron mercury vapor pressure [for standard lamps and filters], the two amalgam mixes were chosen.

Figure 2:
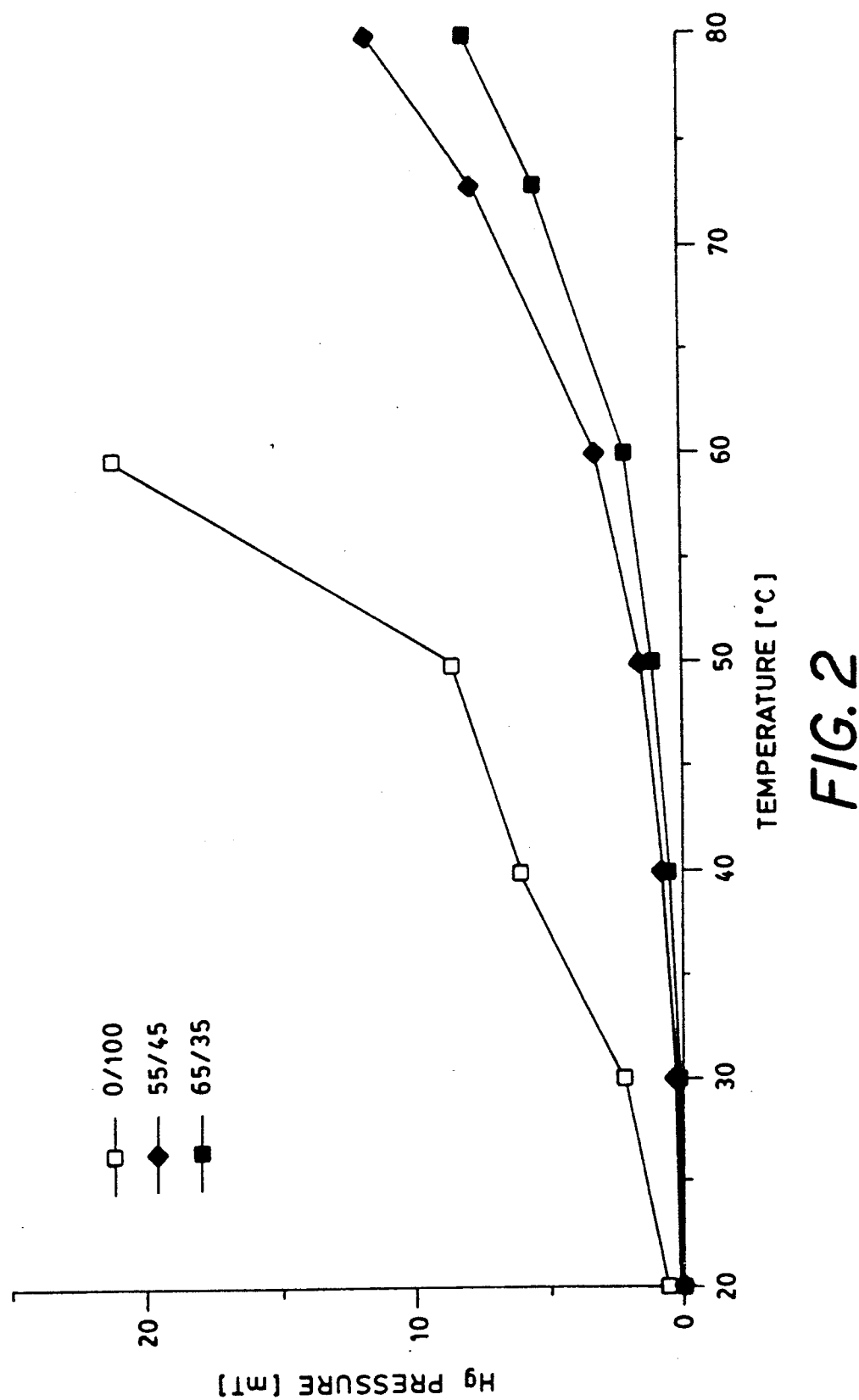
FIG. 2 illustrates mercury amalgam vapor pressure as a function of temperature for two amalgams 55/45 and 65/35 [%In/%Hg] as well as 100% Hg.

Referring to FIG. 2, the mercury density (vapor pressure) for two indium/mercury amalgams was measured at temperatures from 20° to 80° C. using laser absorption spectroscopy. The experiment was carried out in small evacuated glass vials. Two In/Hg amalgams, 55/45 and 65/35 [%In/%Hg] were tested, along with a third "control" vial of 100% natural Hg. From these data, a preferred range of indium in the amalgam can be from about 40 to 80 percent by weight, more preferably from about 50 to 70 percent by weight, and most preferably from about 55 to 65 percent by weight for the preferred 10 mm ID lamp and 10 mm gap filter.

The experiment involved passing a narrow ($\sim 1$ mm) laser beam along a diameter of each vial, and measuring the resonance absorption at 2537 Å. Due to the sub-Doppler linewidth ($<0.00002$ Å) of the continuously tunable dye laser, a spectral profile displaying each of the isotopic resonances was easily measured.

Assuming the temperature inside the vial was uniform, the absorption, A, is related to the density, n, by the Beer's Law expression:

$$A = 1 - exp(-nkx) \qquad (1)$$

where "k" is the absorption coefficient dependent on atomic constants, and "x" is the vial diameter. To ensure a uniform, stable temperature, all the vials were placed in a larger glass tube, through which temperature regulated circulating water flowed.

It should be noted that to extract "n" from "A" using the above equation, one must stay in the region where $(n*k*x \sim 1)$. Obviously, if the density becomes too great, the absorption will be saturated. This necessitated using the $Hg^{196}$ isotopic line for most of the temperatures (40°-80° C.), since the more abundant isotopes yielded saturated absorption line shapes where $A \sim 1$.

For the lowest temperatures (i.e., 20°, 30° C.), the $Hg^{196}$ density was too small $(n*k*x \sim 0)$ and $A \rightarrow 0$. In this case, another isotope, $Hg^{200}$, was used to obtain total mercury density, with suitable adjustment made to the absorption constant, k.

Table 1 shows the absorption fraction on line center for each temperature. Note that the 55/45 amalgam at 73° C. produces nearly the same absorption as the 100% mercury at 40° C. This data satisfies the requirements of the isotope enrichment equipment, as the vapor pressure of mercury at 40° C. is 6 microns, the center of the reactor operating range.

TABLE 1

AMALGAM ABSORPTION TABLE

| AMALGAM [% In/% Hg] | TEMPERATURE [°C] | ABSORPTION FRACTION | TOTAL Hg VAPOR PRESSURE (mT) |
|---|---|---|---|
| 0/100 | 20 | 0.067 $^{196}$Hg | 0.5 |
| 55/45 | 20 | 0.75 $^{200}$Hg | <0.1 |
| 65/35 | 20 | 0.523 $^{200}$Hg | <0.1 |
| 0/100 | 30 | 0.23 $^{196}$Hg | 2.1 |
| 55/45 | 30 | 0.94 $^{200}$Hg | 0.1 |
| 65/35 | 30 | 0.81 $^{200}$Hg | <0.1 |
| 0/100 | 40 | 0.51 $^{196}$Hg | 6.0 |
| 55/45 | 40 | 0.065 $^{196}$Hg | 0.6 |
| 65/35 | 40 | 0.047 $^{196}$Hg | 0.4 |
| 0/100 | 50 | 0.62 $^{196}$Hg | 8.5 |
| 55/45 | 50 | 0.144 $^{196}$Hg | 1.4 |
| 65/35 | 50 | 0.109 $^{196}$Hg | 1.0 |
| 0/100 | 60 | 0.902 $^{196}$Hg | 21.0 |
| 55/45 | 60 | 0.28 $^{196}$Hg | 3.0 |
| 65/35 | 60 | 0.191 $^{196}$Hg | 2.0 |
| 0/100 | 73 | tot. sat. abs. | — |
| 55/45 | 73 | 0.54 $^{196}$Hg | 7.6 |
| 65/35 | 73 | 0.42 $^{196}$Hg | 5.3 |
| 0/100 | 80 | tot. sat. abs. | — |
| 55/45 | 80 | 0.685 $^{196}$Hg | 12.0 |
| 65/35 | 80 | 0.55 $^{196}$Hg | 8.0 |

By way of providing additional data, estimates of the absolute vapor pressure based on the absorption fractions are entered in the table, and shown in FIG. 2. This information could be of use if such amalgams are considered in any other future application. It was arrived at by noting that k depends linearly on the pressure and inversely on the temperature to the 3/2 power. A multiplicative constant was determined by requiring that the total mercury vapor pressure at 40° C. equal 6 microns. Solving eqn. (1) for the vapor pressure:

$$p = -(1.5189 \times 10^{-6}) T^{3/2} \ln(1-A) \text{ [Torr]} \quad (2)$$

Equation (2) is valid for all absorption fractions on Table 1 pertaining to Hg$^{196}$ isotopic lines. For the 4 cases where a Hg$^{200}$ line was utilized, the resulting pressure was multiplied by the ratio of the respective isotopic abundances, namely:

(0.00146/0.2311)

The present invention has been described in detail, including the preferred embodiments thereof. However, it will be appreciated that those skilled in the art, upon consideration of the present disclosure, may make modifications and/or improvements on this invention and still be within the scope and spirit of this invention as set forth in the following claims.

What is claimed is:

1. A process for eliminating the cold spot zones in Hg$^{196}$ isotope enrichment lamps and filters, said process comprising replacing the liquid mercury in said lamps and filters, with a solid mercury amalgam containing from about 55 to about 80 atom weight percent indium.

2. The process of claim 1, wherein the quantity of mercury amalgam is sufficient to control the spectral line width of radiation emitted from lamps to a predetermined value.

* * * * *